(12) United States Patent
Anderson et al.

(10) Patent No.: US 11,910,748 B2
(45) Date of Patent: Feb. 27, 2024

(54) DISCHARGE CHANNEL FOR CUTTING DECK ASSEMBLY AND VEHICLE INCLUDING SAME

(71) Applicant: THE TORO COMPANY, Bloomington, MN (US)

(72) Inventors: Robert L. Anderson, Bloomington, MN (US); Jeffrey W. Stern, Savage, MN (US); Curtis E. Wersal, Bloomington, MN (US)

(73) Assignee: THE TORO COMPANY, Bloomington, MN (US)

( * ) Notice: Subject to any disclaimer, the term of this patent is extended or adjusted under 35 U.S.C. 154(b) by 720 days.

(21) Appl. No.: 17/019,866

(22) Filed: Sep. 14, 2020

(65) Prior Publication Data
US 2021/0076567 A1 Mar. 18, 2021

Related U.S. Application Data

(60) Provisional application No. 62/901,466, filed on Sep. 17, 2019.

(51) Int. Cl.
*A01D 34/81* (2006.01)
*A01D 34/66* (2006.01)
*A01D 34/71* (2006.01)
*A01D 101/00* (2006.01)

(52) U.S. Cl.
CPC .......... *A01D 34/81* (2013.01); *A01D 34/667* (2013.01); *A01D 34/71* (2013.01); *A01D 2101/00* (2013.01)

(58) Field of Classification Search
CPC ...... A01D 34/667; A01D 34/81; A01D 34/71; A01D 34/005; A01D 42/005
See application file for complete search history.

(56) References Cited

U.S. PATENT DOCUMENTS

| | | | | | |
|---|---|---|---|---|---|
| 4,226,074 | A | * | 10/1980 | Mullet | A01D 34/685 56/13.6 |
| 5,035,108 | A | * | 7/1991 | Meyer | A01D 34/685 56/320.2 |
| 5,205,112 | A | * | 4/1993 | Tillotson | A01D 34/685 56/DIG. 17 |
| 5,267,429 | A | * | 12/1993 | Kettler | A01D 34/005 56/320.2 |
| 5,765,346 | A | * | 6/1998 | Benter | A01D 34/005 56/2 |

(Continued)

*Primary Examiner* — Thomas B Will
*Assistant Examiner* — Julia C Tran
(74) *Attorney, Agent, or Firm* — Mueting Raasch Group (57) ABSTRACT

Various embodiments of a cutting deck assembly and a grounds maintenance vehicle that includes such assembly. The assembly includes a top surface and a sidewall extending from the top surface. The top surface and the sidewall partially surround a first cutting chamber and a second cutting chamber. The assembly further includes a channel disposed adjacent a rear portion of the sidewall and extending along a channel axis between a first end and a second end of the channel, where the first end of the channel is connected to an outlet of the first cutting chamber; and a ramp disposed at least partially within the channel and adjacent the second end of the channel. The ramp includes a directing surface that is adapted to deflect at least a portion of clippings that enter the channel from the outlet of the first cutting chamber.

19 Claims, 5 Drawing Sheets

(56) References Cited

U.S. PATENT DOCUMENTS

| | | | | |
|---|---|---|---|---|
| 7,062,898 | B2* | 6/2006 | Sarver | A01D 43/06 |
| | | | | 56/320.1 |
| 7,093,415 | B2 | 8/2006 | Kallevig et al. | |
| 7,574,852 | B1* | 8/2009 | Loxterkamp | A01D 34/667 |
| | | | | 56/320.2 |
| 11,044,846 | B2* | 6/2021 | Kelly | A01D 34/81 |
| 2003/0005679 | A1* | 1/2003 | Buss | A01D 34/66 |
| | | | | 56/6 |
| 2005/0268588 | A1 | 12/2005 | Winter et al. | |
| 2006/0230735 | A1* | 10/2006 | Samejima | A01D 34/71 |
| | | | | 56/320.2 |
| 2012/0102906 | A1* | 5/2012 | Bedford | A01D 34/005 |
| | | | | 56/320.2 |
| 2017/0245433 | A1* | 8/2017 | Derra | A01D 34/005 |
| 2017/0332552 | A1 | 11/2017 | Andre et al. | |
| 2017/0339826 | A1* | 11/2017 | Harvey | A01D 34/664 |
| 2019/0124835 | A1* | 5/2019 | Hilgart | A01D 34/661 |
| 2020/0281117 | A1* | 9/2020 | Smeets | A01D 34/66 |
| 2022/0095537 | A1* | 3/2022 | Rukamp | A01D 34/71 |

* cited by examiner

DISCHARGE CHANNEL FOR CUTTING DECK ASSEMBLY AND VEHICLE INCLUDING SAME

The present application claims the benefit of U.S. Provisional Application Ser. No. 62/901,466, filed Sep. 17, 2019, which is incorporated by reference.

Embodiments of the present disclosure are directed to cutting deck assemblies such as those used with riding lawn mowers and, more particularly, to assemblies that include clippings management systems.

BACKGROUND

Lawn mowers that carry a multibladed rotary cutting deck assembly are generally known. These deck assemblies typically have one or more blades that rotate in substantially horizontal cutting planes to cut grass over a relatively wide swath as the mower passes over the ground. Some cutting deck assemblies can utilize three cutting blades arranged in a staggered configuration having a forward central cutting blade flanked on each side by trailing side cutting blades. Such a fore-and-aft staggered configuration allows the deck to cut an unbroken swath of grass without inadvertent contact of the blades with one another.

Some such lawn mowers can collect clippings from the cut grass in a bag or receptacle for subsequent disposal. Alternatively, the deck assembly may include an opening or chute that discharges clippings from the cutting deck onto the ground. For example, a cutting deck can include a side discharge opening that directs clippings from the cutting deck to the side of the mower and onto the ground.

SUMMARY

In general, the present disclosure provides various embodiments of a cutting deck assembly and a grounds maintenance vehicle that can include such cutting deck assembly. The cutting deck assembly can include a clippings management system having a channel that can be connected to one or more cutting chambers of the assembly. The cutting deck assembly can also include a ramp disposed at least partially within the channel and that includes a directing surface that is adapted to deflect at least a portion of clippings that enter the channel from an outlet of one or more of the cutting chambers of the assembly. In one or more embodiments, clippings from one or more of the cutting chambers of the assembly can be collected within the channel and dispersed in any desired direction by the channel. For example, in one or more embodiments, a portion of clippings from a cutting chamber of the assembly can be directed into the channel and then redirected by the channel or the ramp toward a ground surface or into another cutting chamber of the assembly. In contrast to side discharge chutes that are included with some cutting deck assemblies, where the side discharge chute allows grass clippings to be distributed from the assembly outward through a side portion of the assembly, the channel of one or more embodiments of the present disclosure can provide discharge of clippings in a controlled manner such that at least a portion of the clippings is not discharged onto sidewalks, driveways, gardens, etc., that are adjacent to the side discharge chute. Further, one or more embodiments of clippings management system can provide controlled distribution or dispersion into a lawn.

In one aspect, the present disclosure provides a cutting deck assembly. The assembly includes a top surface and a sidewall extending from the top surface, where the sidewall includes a front portion, a rear portion, a first side portion, and a second side portion. The top surface and the sidewall partially surround a first cutting chamber and a second cutting chamber, where each of the first and second cutting chambers is adapted to contain a cutting blade. The assembly further includes a channel disposed adjacent the rear portion of the sidewall and extending along a channel axis between a first end and a second end of the channel, where the first end of the channel is connected to an outlet of the first cutting chamber. The assembly further includes a ramp disposed at least partially within the channel and adjacent the second end of the channel. The ramp includes a directing surface that is adapted to deflect at least a portion of clippings that enter the channel from the outlet of the first cutting chamber.

In another aspect, the present disclosure provides a grounds maintenance vehicle. The vehicle includes a frame having a front end, a rear end, and a longitudinal axis extending between the front end and the rear end, and a cutting deck assembly connected to the frame at or near the front end of the frame. The cutting deck assembly includes a top surface and a sidewall extending from the top surface, where the sidewall includes a front portion, a rear portion, a first side portion, and a second side portion. The top surface and the sidewall partially surround a first cutting chamber and a second cutting chamber, where each of the first and second cutting chambers is adapted to contain a cutting blade. The assembly also includes a channel disposed adjacent the rear portion of the sidewall and extending along a channel axis, where the channel includes a first end connected to an outlet of the first cutting chamber and a second end. The assembly further includes a ramp disposed at least partially within the channel and adjacent the second end of the channel. The ramp includes a directing surface that is adapted to deflect at least a portion of clippings that enter the channel from the outlet of the first cutting chamber.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing that form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." The term "and/or" (if used) means one or all of the listed elements or a combination of any two or more of the listed elements. "I.e." is used as an abbreviation for the Latin phrase id est, and means "that is." "E.g.," is used as an abbreviation for the Latin phrase exempli gratia, and means "for example."

Figure 1:
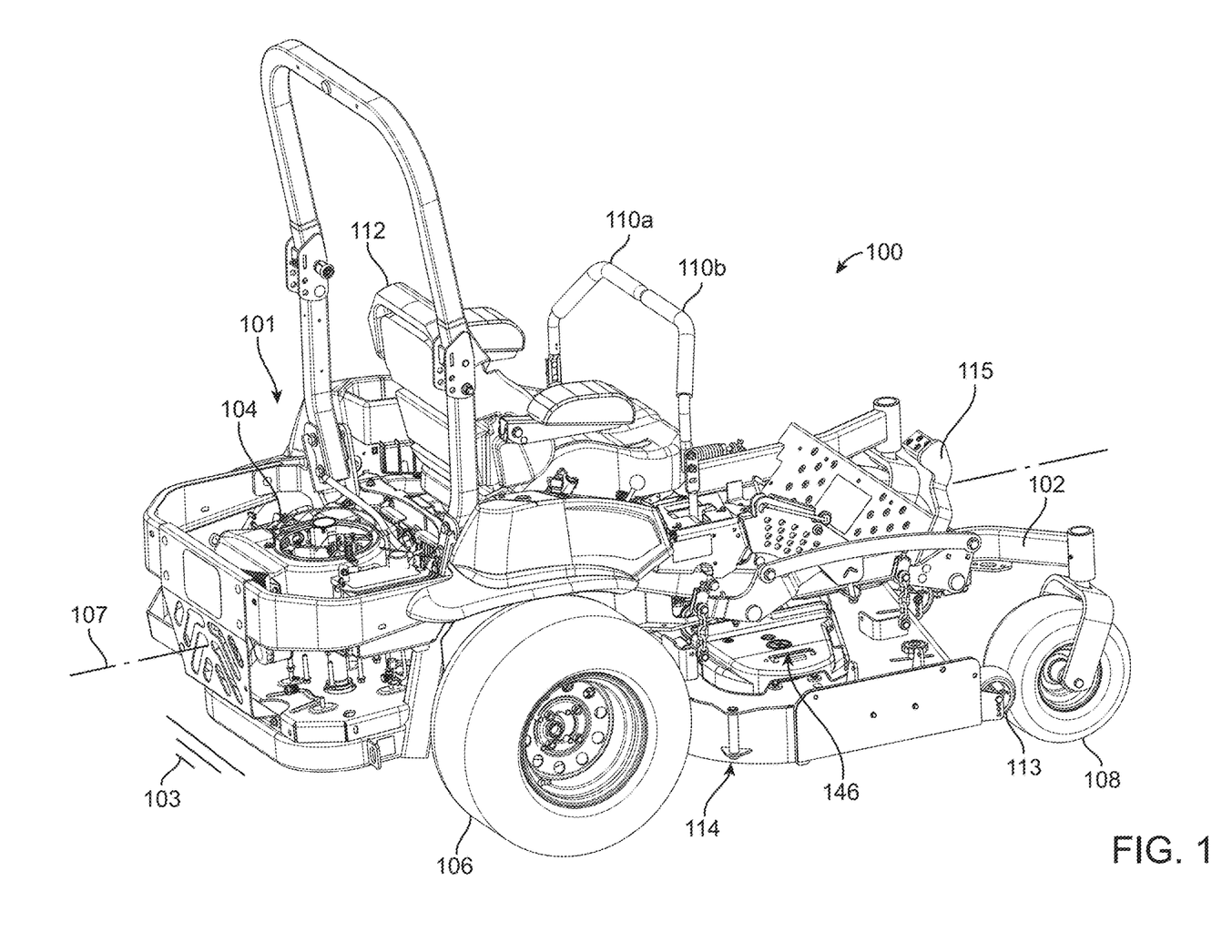
FIG. 1 is a perspective view of one embodiment of a grounds maintenance vehicle.

FIG. 1 is a perspective view of one embodiment of a grounds maintenance vehicle 100 that includes a power system 101 and a cutting deck assembly 114 connected to a prime mover 104 by an implement drive system 146.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the vehicle 100 while the vehicle is in an operating configuration, e.g., while the vehicle is positioned such that wheels 106 and 108 rest upon a generally horizontal ground surface 103 as shown in FIG. 1. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

In general, the present disclosure provides various embodiments of a cutting deck assembly and a grounds maintenance vehicle that can include such cutting deck assembly. The cutting deck assembly can include a clippings management system having a channel that can be connected to one or more cutting chambers of the assembly. The cutting deck assembly can also include a ramp disposed at least partially within the channel and that includes a directing surface that is adapted to deflect at least a portion of clippings that enter the channel from an outlet of one or more of the cutting chambers of the assembly. In one or more embodiments, clippings from one or more of the cutting chambers of the assembly can be collected within the channel and dispersed in any desired direction by the channel. For example, in one or more embodiments, a portion of clippings from a cutting chamber of the assembly can be directed into the channel and then redirected by the channel or the ramp toward a ground surface or into another cutting chamber of the assembly. In contrast to side discharge chutes that are included with some cutting deck assemblies, where the side discharge chute allows grass clippings to be distributed from the assembly outward through a side portion of the assembly, the channel of one or more embodiments of the present disclosure can provide discharge of clippings in a controlled manner such that at least a portion of the clippings are not discharged onto sidewalks, driveways, gardens, etc., that are adjacent the side discharge chute. Further, one or more embodiments of clippings management system can provide controlled distribution or dispersion into a lawn.

While the general construction of the grounds maintenance vehicle 100 is not necessarily central to an understanding of exemplary embodiments (e.g., other vehicle configurations are certainly contemplated), the general construction of the vehicle is briefly described herein.

With reference to the figures of the drawing, wherein like reference numerals designate like parts and assemblies throughout the several views, FIG. 1 illustrates the vehicle 100 in accordance with embodiments of the present disclosure. The vehicle 100 can include any suitable vehicle, e.g., a turf vehicle. As used herein, a "turf vehicle" can include most any self-propelled vehicle adapted to provide a maintenance function to a turf or other surface. While shown as a riding, self-propelled, turf vehicle, e.g., a zero-radius-turning (ZRT) riding lawn mower 100 (also referred to herein simply as a "vehicle" or "mower"), such a configuration is not limiting. That is, while embodiments are described herein regarding a riding mower, those of skill in the art will realize that embodiments of the present disclosure are equally applicable to other types of walk-behind or riding (e.g., stand-on) turf care products.

Figure 7:
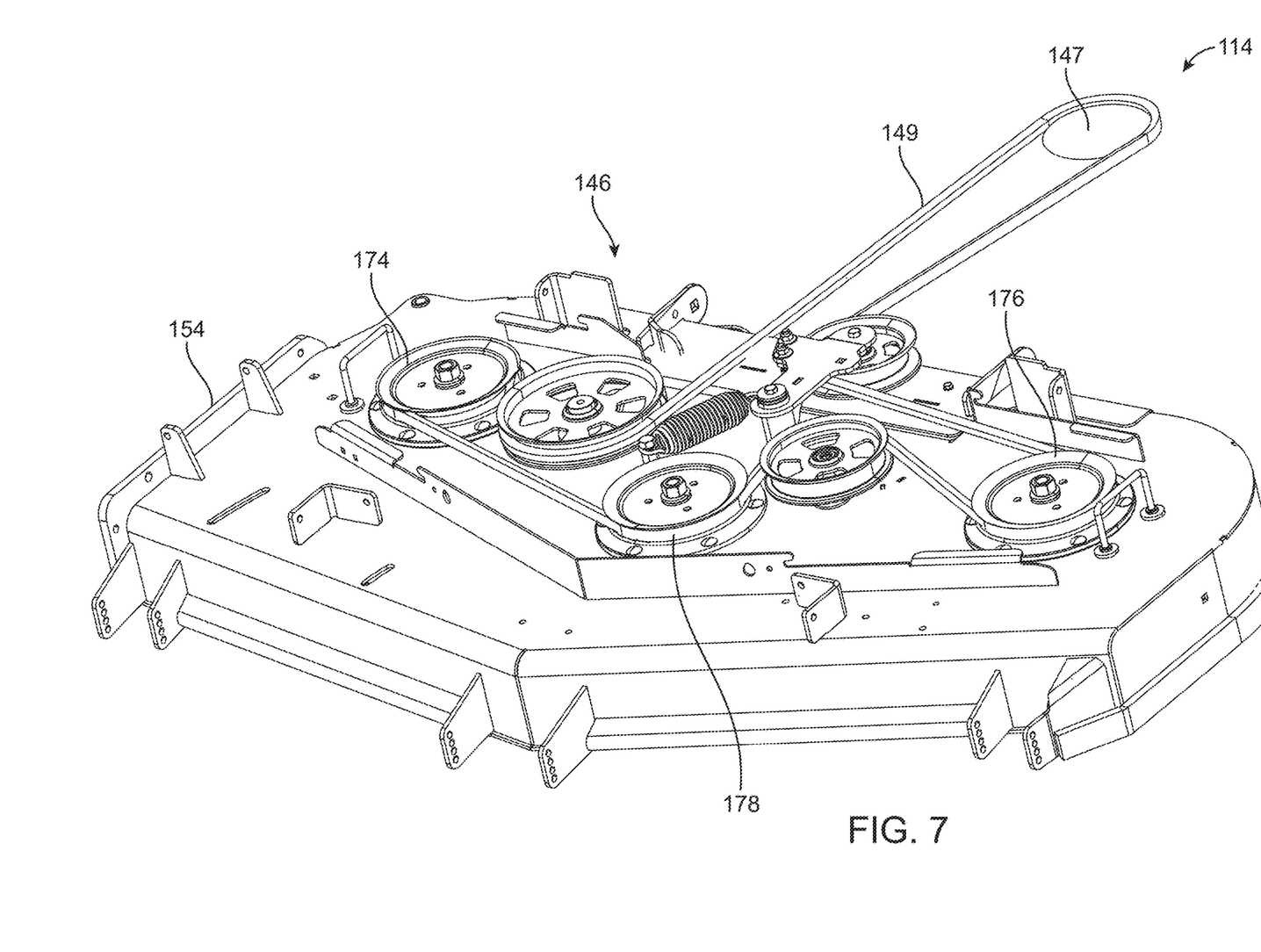
FIG. 7 is a top perspective view of the cutting deck assembly of FIG. 2 connected to an implement drive system.

As shown in FIG. 1, the vehicle 100 can include a chassis or frame 102 supporting a power system 101 that includes a prime mover 104 and an implement drive system 146 (FIG. 7). The prime mover 104 can include, e.g., an electric motor or internal combustion engine. Left and right ground engaging drive members 106 can be rotatably coupled to left and right sides, respectively, of a rear portion of the chassis 102/vehicle 100. The drive wheels 106 can be independently powered by the prime mover 104 (e.g., via one or more hydraulic motors, transaxles, transmissions, or the equivalent) so that the drive wheels 106 can support the chassis 102/vehicle 100 relative to, and selectively propel the vehicle over, the ground surface 103 during operation.

One or more controls, e.g., left and right drive control levers 110a-b can also be provided. The drive control levers 110a-b are generally pivotally coupled to the vehicle 100 such that they may pivot forwardly and rearwardly (e.g., about an axis transverse to a longitudinal axis 107 of the vehicle) under the control of an operator located on an operator platform, e.g., sitting in an operator seat 112. The drive control levers 110a-b are operable to independently control speed and direction of their respective drive wheels 106 via manipulation of the vehicle's drive system as is known in the art. While illustrated herein as incorporating separate drive control levers 110a-b, other controls, e.g., single or multiple joysticks or joystick-type levers, steering wheels, etc., can also be used without departing from the scope of the disclosure. The vehicle 100 can further include various other mower controls (power take-off engagement, ignition, throttle, etc.), as is known in the art.

The illustrative vehicle 100 can also include a pair of front swiveling caster wheels 108 that support a front portion of the vehicle in rolling engagement with the ground surface 103 during operation. Other drive configurations (e.g., actively steered front and/or rear wheels, tri-wheel configurations, front drive wheels, etc.) and vehicles using drive members other than wheels (e.g., tracks), are certainly contemplated within the scope of this disclosure.

A ground working tool such as a cutting deck assembly 114 can be mounted to a lower side of the chassis 102, e.g., generally between the drive wheels 106 and the caster wheels 108. The cutting deck assembly 114 can include a top surface 116 and a sidewall 118 (FIG. 3) that partially define one or more cutting chambers (e.g., first cutting chamber 128 of FIG. 2). Each cutting chamber can partially surround one or more rotatable cutting blades 132 (FIG. 2), where each rotating cutting blade is attached to a rotatable blade spindle assembly of the deck (FIG. 7). While illustrated as a belly-mount deck, other mower configurations can, alternatively or in addition, utilize an out-front or rear-mounted (e.g., towed) deck.

During operation, power is selectively delivered by the prime mover 104 to the cutting deck assembly 114 (e.g., to the spindle assemblies) and the drive wheels 106, whereby the cutting blades rotate at a speed sufficient to sever grass and other vegetation as the deck passes over the ground surface 103 (e.g., as the mower moves forwardly in a direction parallel to the longitudinal axis 107). As stated herein, the cutting deck assembly 114 is connected to the prime mover 104 by the implement drive system 146 (FIG. 7). The implement drive system 146 can include any suitable system for transferring power from the prime mover 104 to the cutting deck assembly 114. As shown in FIG. 7, the implement drive system 146 includes a drive pulley 147 that is operatively connected to a drive shaft of the prime mover 104 using any suitable technique or techniques. In turn, the implement drive system 146 can include an endless belt 149 that engages the drive pulley 147. The endless belt 149 also engages a first spindle pulley 174, a second spindle pulley 176, and third spindle pulley 178. The first spindle pulley 174 is connected by a spindle to a rotating blade 132 disposed in a first cutting chamber 128 (FIG. 2), the second spindle pulley 176 is connected by a spindle to a rotating blade disposed in a second cutting chamber 130, and the third spindle pulley 178 is connected by a spindle to a rotating blade disposed in a third cutting chamber 150.

Typically, the cutting deck assembly 114 further includes an operator-selectable height-of-cut control system 115 (FIG. 1) to allow deck height adjustment relative to the ground surface 103. The cutting deck assembly 114 can optionally include anti-scalp rollers 113 to assist in reducing blade/ground contact.

The vehicle 100 can include any suitable cutting deck assembly 114. As shown in greater detail in FIGS. 2-7, the exemplary cutting deck assembly 114 includes the top surface 116 and the sidewall 118 extending from the top surface. The sidewall 118 includes a front portion 120, a rear portion 122, a first side portion 124, and a second side portion 126. The top surface 116 and the sidewall 118 at least partially surround the first cutting chamber 128 and the second cutting chamber 130. As stated herein, each of the first and second cutting chambers 128, 130 is adapted to contain a cutting blade 132.

Figure 2:
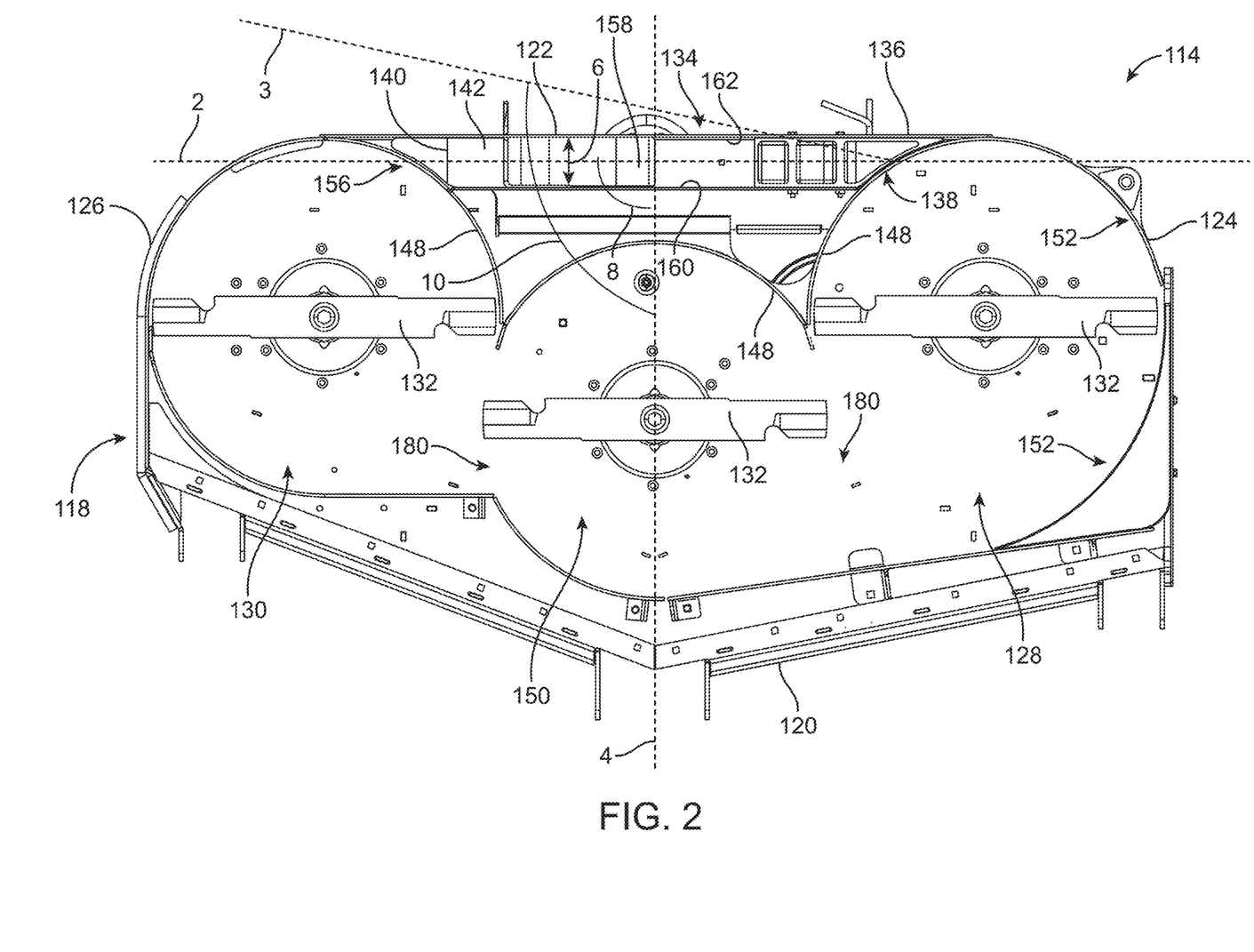
FIG. 2 is a bottom view of one embodiment of a cutting deck assembly that can be utilized with the grounds maintenance vehicle of FIG. 1.

Unlike conventional deck assemblies, the assembly 114 also includes a channel 134 that is disposed adjacent the rear portion 122 of the sidewall 118 and extends along a channel axis 2. The channel 134 includes a first end 136 connected to an outlet 138 of the first cutting chamber 128, and a second end 140. A ramp 142 is disposed at least partially within the channel 134 and adjacent the second end 140 of the channel. The ramp 142 includes a directing surface 144 that is adapted to deflect at least a portion of clippings that enter the channel 134 from the outlet 138 of the first cutting chamber 128.

The top surface 116 can take any suitable shape or shapes and have any suitable dimensions. Further, the top surface 116 can face downward when the assembly 114 is connected to the vehicle 100 and the vehicle is in contact with the ground surface 103 (FIG. 1).

Extending from the top surface 116 is the sidewall 118. The sidewall 118 can take any suitable shape or shapes and have any suitable dimensions. In one or more embodiments, the sidewall 118 can be integral with the top surface 116. As used herein, the term "integral" means that two or more elements or components are manufactured together as one piece and not manufactured separately and then connected together. In one or more embodiments, the sidewall 118 can be manufactured separately from the top surface 116 and connected to the top surface 116 using any suitable technique or techniques.

As stated herein, the sidewall 118 includes the front portion 120, the rear portion 122, the first side portion 124, and the second side portion 126. The various portions of the sidewall 118 can be integral. In one or more embodiments, one or more portions of the sidewall 118 can be manufactured separately and then connected together using any suitable technique or techniques.

One or more portions of the top surface 116 and one or more portions of the sidewall 118 partially surround the first cutting chamber 128. Further, as stated above, one or more portions of the top surface 116 and one or more portions of the sidewall 118 partially surround the second cutting chamber 130. In one or more embodiments, the top surface 116 and the sidewall 118 define first and second cutting chambers 128, 130 that are enclosed over the sides and top thereof but are open at the bottom thereof.

Each of the first and second cutting chambers 128, 130 is adapted to contain the cutting blade 132 as shown in FIG. 2. Such cutting blades 132 are adapted to rotate in a generally horizontal cutting plane about a generally vertical rotational axis. Each cutting blade 132 has sharpened cutting edges that cut the grass as the blade rotates in its cutting plane. The height of cut is determined by how far the blades are positioned above the ground surface 103, which is, in turn, determined by the relative position of cutting deck assembly 114. Any suitable technique or techniques can be utilized to rotate the cutting blades 132 within the cutting chambers. In one or more embodiments, the implement drive system 146 (FIG. 7) can connect the cutting blades 132 to the prime mover 104 of the vehicle 100 to provide rotational power to the cutting blades.

The cutting deck assembly 114 can include any suitable number of cutting chambers, e.g., 1, 2, 3, 4, 5, or more cutting chambers. In one or more embodiments, the assembly 114 can include the third cutting chamber 150 disposed between the first and second cutting chambers 128, 130. The third cutting chamber can be at least partially surrounded by the top surface 116 and the sidewall 118. Further, the third cutting chamber 150 is also adapted to contain a cutting blade 132.

In one or more embodiments, the assembly 114 can include an interior baffle or baffles 148 that further define the cutting chambers 128, 130, 150. The interior baffle 148 can extend from the top surface 116. In one or more embodiments, one or more portions of the interior baffle 148 can be integral with the top surface 116. Further, in one or more embodiments, one or more portions of the baffle 148 can be manufactured separately and connected to the top surface 116 using any suitable technique or techniques. The interior baffle 148 can take any suitable shape or shapes and have any suitable dimensions.

Further, the cutting chambers 128, 130, 150 can take any suitable shape or shapes and have any suitable dimensions. In one or more embodiments, the cutting chambers 128, 130, 150 can be at least partially open as shown in FIG. 2 such that the first cutting chamber is connected to the third cutting chamber and the second cutting chamber is also connected to the third chamber. In one or more embodiments, openings 180 can be disposed in the baffle 148 between one or more of the cutting chambers 128, 130, 150 such that two or more of the cutting chambers are connected.

At least one of the first, second, or third cutting chambers 128, 130, 150 can include one or more inlets or outlets formed in at least one of the sidewall 118 or interior baffle 148. As illustrated in FIGS. 2-5, the first cutting chamber 128 includes the outlet 138 that is connected to the first end 136 of the channel 134. The outlet 138 can take any suitable shape or shapes and have any suitable dimensions. In one or more embodiments, the outlet 138 is adapted to allow a portion of clippings disposed in the first cutting chamber 128 to be directed from the chamber and into the channel 134. In one or more embodiments, the second cutting chamber 130 includes an inlet 156 that is connected to the second end 140 of the channel 134. The inlet 156 can take any suitable shape or shapes and have any suitable dimensions. In one or more embodiments, the inlet 156 is adapted to allow a portion of clippings disposed in the channel 134 to be directed from the channel and into the second cutting chamber 130. Although not shown, the third cutting chamber 150 can include an inlet that is adapted to allow a portion of clippings to be directed either into or out of the channel 134.

In the illustrated embodiments, the channel 134 is disposed adjacent the rear portion 122 of the sidewall 118. As used herein, the phrase "adjacent the rear portion" means that an element or component of the assembly 114 is disposed closer to the rear portion 122 of the sidewall 118 than to the first and second side portions 124, 126 or the front portion 120 of the sidewall. The channel 134 extends along the channel axis 2 between the first end 136 and the second end 140 of the channel. The first end 136 of the channel 134 is connected to the outlet 138 of the first cutting chamber 128. In one or more embodiments, the second end 140 of the channel 134 is connected to the inlet 156 of the second cutting chamber 130.

The channel 134 can include a top wall 158 (FIG. 5), a first vertical wall 160 (FIG. 3), and a second vertical wall 162 (FIG. 2). In one or more embodiments, the channel 134 can be open facing away from the top wall 158. In one or more embodiments, the channel 134 can include a bottom wall (not shown) connected to the first and second vertical walls 160, 162. In one or more embodiments, the bottom wall can include one or more apertures such as a screen that can allow clippings that are disposed in the channel 134 to fall toward the ground surface 103.

The top wall 158 and the first and second vertical walls 160, 162 (and bottom wall if present) can take any suitable shape or shapes and have any suitable dimensions. In one or more embodiments, one or more portions of at least one of the top wall 158 or the first and second vertical walls 160, 162 can be planar in shape. In one or more embodiments, one or more portions of at least one of the top wall 158 or the first and second vertical walls 160, 162 can be curved.

In one or more embodiments, the top wall 158 is formed by the top surface 116 of the assembly 114. In one or more embodiments, the top wall 158 is disposed adjacent the top surface 116 of the assembly 114. The vertical walls 160, 162 of the channel 134 can extend vertically from the top surface 116 of the assembly 114. In one or more embodiments, the vertical walls 160, 162 can extend vertically from the top wall 158 of the channel 134. One or more portions of the channel 134 can be integral with at least one of the top surface 116 or the sidewall 118 of the assembly 114. In one or more embodiments, the channel 134 can be manufactured separately and connected to at least one of the top surface 116 or sidewall 118 of the assembly 114 using any suitable technique or techniques. In one or more embodiments, the second vertical wall 162 can be formed or provided by the rear portion 122 of the sidewall 118. In one or more embodiments, the second vertical wall 162 can be manufactured separately from the sidewall 118 and disposed adjacent the rear portion 122 of the sidewall.

The channel 134 can take any suitable shape or shapes and have any suitable dimensions. For example, in one or more embodiments, the channel 134 can have a rectangular cross-sectional shape in a plane orthogonal to the channel axis 2. In one or more embodiments, the channel 134 can have an elliptical cross-sectional shape in the plane orthogonal to the channel axis 2. In one or more embodiments, the channel 134 can have a constant cross-sectional area in the plane orthogonal to the channel axis 2. Further, in one or more embodiments, a cross-sectional area of the channel 134 in the plane orthogonal to the channel axis 2 can vary along the channel axis.

In one or more embodiments, a distance 6 between the first and second vertical walls 160, 162 measured in a direction orthogonal to the channel axis 2 remains constant along the channel axis. In one or more embodiments, the distance 6 between the first and second vertical walls 160, 162 measured in the direction orthogonal to the channel axis 2 varies along the channel axis. Such variance in distance 6 between the first and second vertical walls 160, 162 can be provided by changing an angle formed between one or both of the vertical walls and the channel axis 2. For example, an angle of greater than 0° and no greater than 90° can be formed between one or both of the first and second vertical walls 160, 162 and the channel axis such that the channel 134 fans out in a plane parallel to the top surface 116.

The channel 134 can be disposed in any suitable location relative to the sidewall 118 and the cutting chambers 128, 130, 150. As shown in FIG. 2, the channel 134 is disposed adjacent the rear portion 122 of the sidewall 118. Further, the channel axis 2 can be disposed in any suitable relationship relative to a longitudinal axis 4 of the assembly 114 that extends between the front portion 120 and the rear portion 122 of the sidewall 118 of the assembly. The channel axis 2 can form any suitable angle 8 with the longitudinal axis 4 of the assembly 114. In one or more embodiments, this angle 8 can be greater than 0 degrees and less than 190 degrees.

In one or more embodiments, the angle 8 can be at least 40 degrees and no greater than 185 degrees. For example, as shown in FIG. 2, angle 8 is equal to about 90 degrees. Further, for example, the channel 134 can extend along channel axis 3 as is also shown in FIG. 2. Channel axis 3 can form any suitable angle 10 with the longitudinal axis 4. As shown in FIG. 2, the angle 10 is greater than 90 degrees and less than 180 degrees.

Disposed at least partially within the channel 134 is the ramp 142. The ramp 142 can be disposed in any suitable location relative to the channel 134. In one or more embodiments, the ramp 142 can be disposed entirely within the channel 134. In one or more embodiments, the ramp 142 can be disposed adjacent the second end 140 of the channel 134. As used herein, the phrase "adjacent the second end of the channel" means that an element or component of the assembly 114 is disposed closer to the second end 140 of the channel 134 than to the first end 136.

Figure 3:
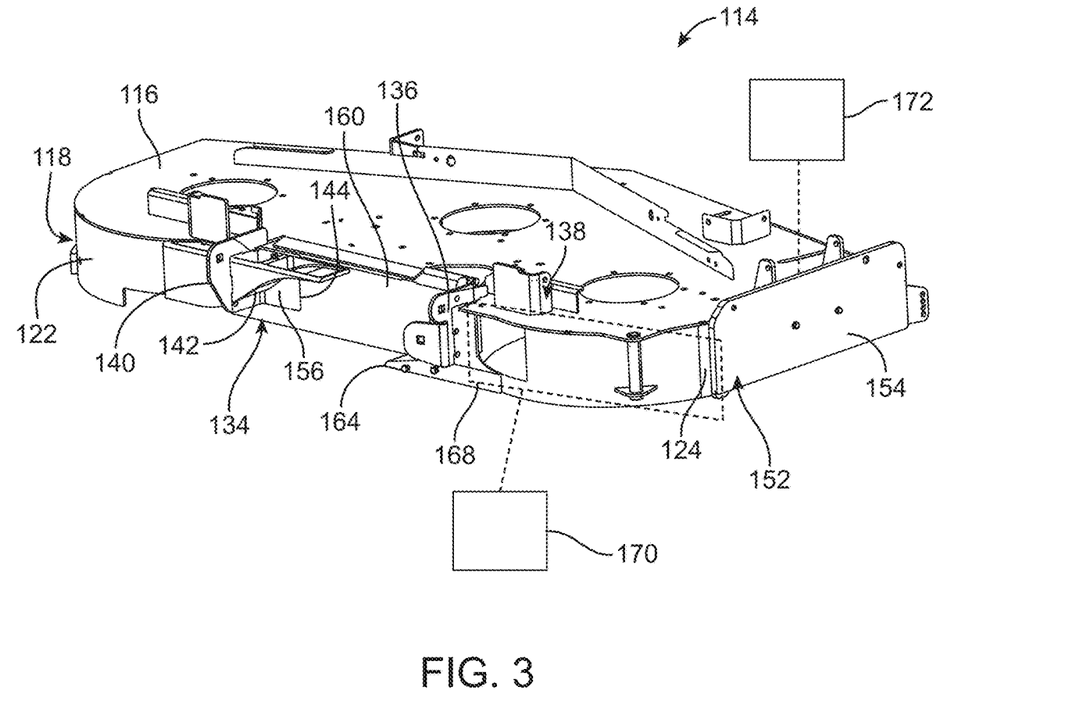
FIG. 3 is a top cut-away view of the cutting deck assembly of FIG. 2.
Figure 4:
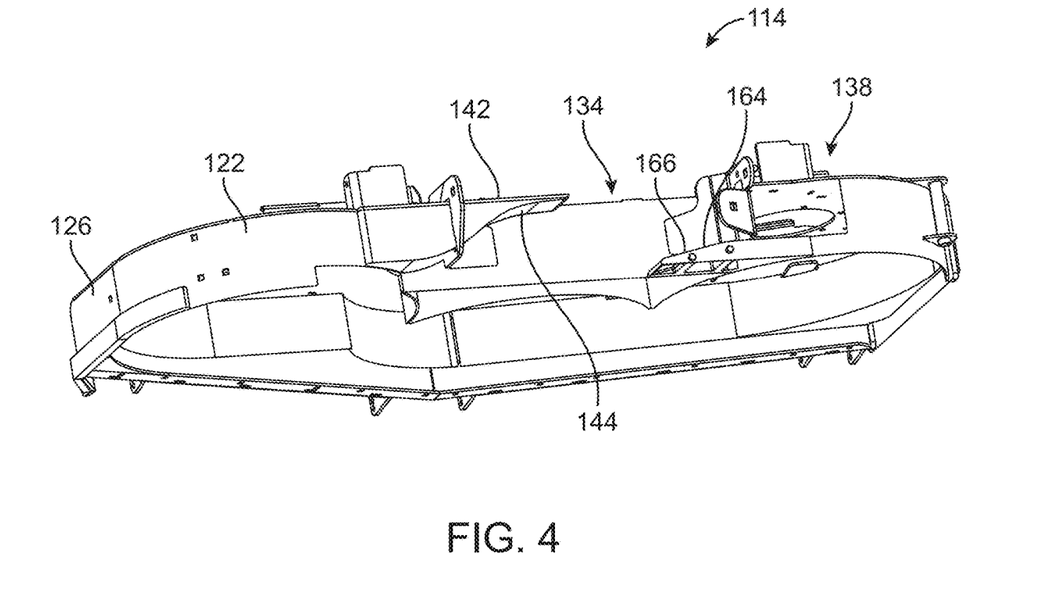
FIG. 4 is a bottom perspective view of the cutting deck assembly of FIG. 2.
Figure 5:
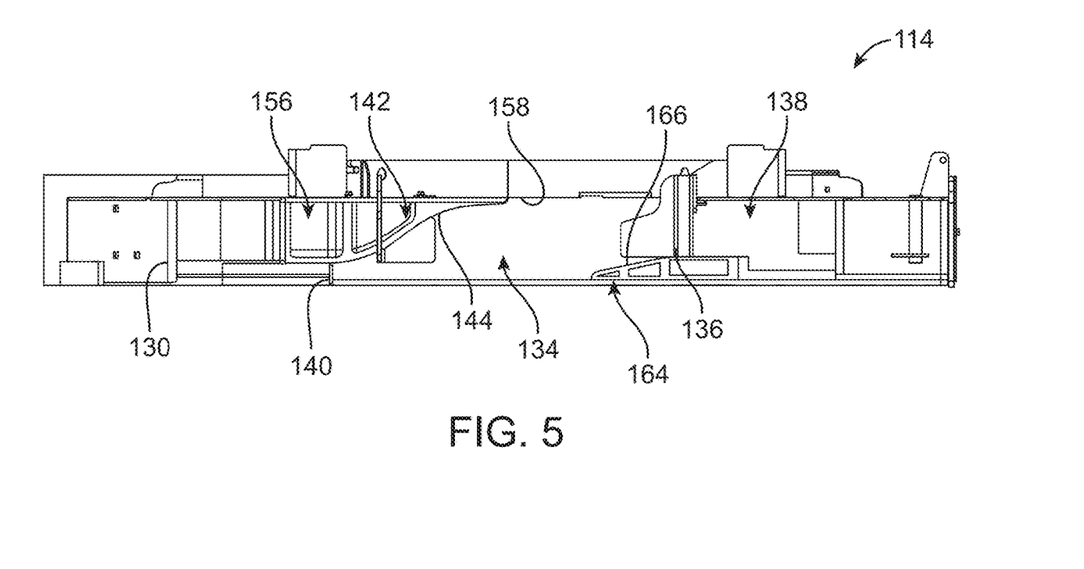
FIG. 5 is a cross-section view of a channel of the cutting deck assembly of FIG. 2.
Figure 6:
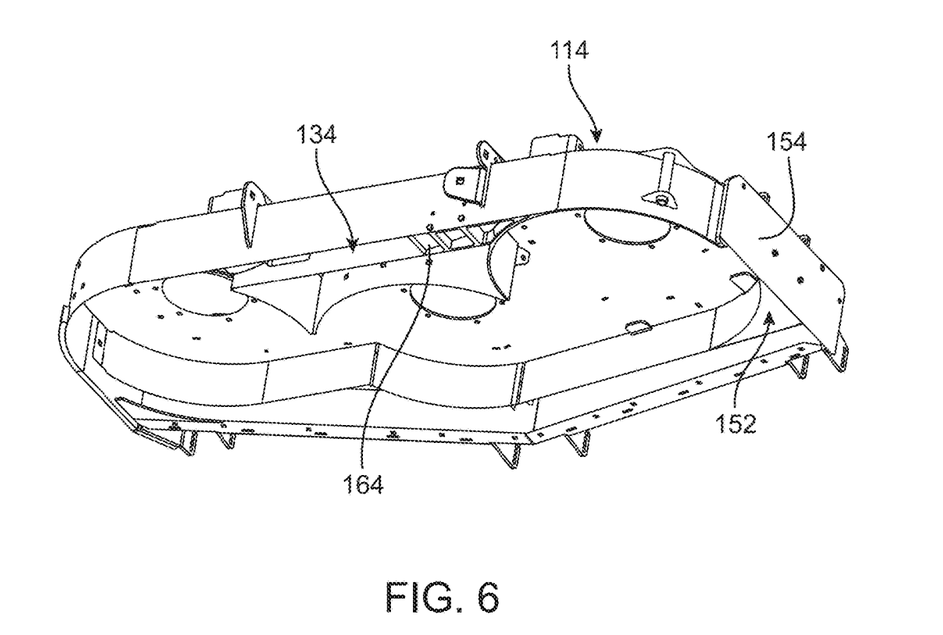
FIG. 6 is a bottom perspective view of the cutting deck assembly of FIG. 2.

The ramp 142 can take any suitable shape or shapes and have any suitable dimensions. The ramp 142 includes the directing surface 144 that is adapted to deflect at least a portion of clippings that enter the channel 134 from the outlet 138 of the first cutting chamber 128. The directing surface 144 of the ramp 142 can also take any suitable shape or shapes and have any suitable dimensions. In one or more embodiments, the directing surface 144 of the ramp 142 can take a planar shape. In one or more embodiments, the directing surface 144 of the ramp 142 can take a nonplanar shape as shown in FIGS. 3-5. Any suitable nonplanar shape can be utilized for the directing surface 144, e.g., curved, parabolic, hyperbolic, complex curved, faceted, etc. In one or more embodiments, the directing surface 144 can include one or more planar portions and one or more curved portions. In general, the directing surface 144 of ramp 142 can face away from the top wall 158 of the channel 134. In one or more embodiments, the directing surface 144 of the ramp 142 is adapted to deflect clippings in a direction away from the top surface 116 of the assembly 114.

As mentioned herein, the second cutting chamber 130 includes an inlet 156 adjacent the second end 140 of the channel 134. In one or more embodiments, the channel 134 is adapted such that at least a portion of clippings deflected by the ramp 142 is directed into the second cutting chamber 130 through the inlet 156.

The channel 134 can include any suitable number of ramps, e.g., 1, 2, 3, or more ramps. As illustrated in FIGS. 2-6, the channel 134 includes ramp 142 and a second ramp 164 that is disposed at least partially within the channel 134. In one or more embodiments, the second ramp 164 can be disposed entirely within the channel 134. Further, the second ramp 164 can be disposed in any suitable location relative to the channel 134. As illustrated in FIGS. 2-6, the second ramp 164 is disposed adjacent the first end 136 of the channel 134. As used herein, the phrase "adjacent the first end of the channel" means that an element or component of the assembly 114 is disposed closer to the first end 136 of the channel 134 than to the second end 140 of the channel. The second ramp 164 can include any suitable ramp or ramps, e.g., ramp 142. The second ramp 164 includes a directing surface 166 that is adapted to deflect at least a portion of the clippings that enter the channel 134.

The second ramp 164 can take any suitable shape or shapes and have any suitable dimensions. Further, the directing surface 166 of the second ramp 164 can take any suitable shape or shapes, e.g., the same shapes described herein regarding directing surface 144 of ramp 142. In one or more embodiments, the directing surface 166 can face the top wall 158 of the channel 134. In one or more embodiments, the directing surface 166 of the second ramp 164 can be adapted to deflect clippings in a direction toward the top surface 116 of the assembly 114.

In one or more embodiments, the channel 134 can be adapted such that at least a portion of clippings deflected by the second ramp 164 is directed into the second cutting chamber 130 through the inlet 156 of the second cutting chamber. In such embodiments, some of the clippings that are deflected by the second ramp 164 may not be deflected by the ramp 142 but instead are directed past the ramp and into the second cutting chamber 130 through the inlet 156. In one or more embodiments, a portion of the clippings that are deflected by the second ramp 164 may also be deflected by the ramp 142 and directed into the second cutting chamber 130 through the inlet 156. In one or more embodiments, a portion of the clippings that are deflected by the second ramp 164 may also be deflected by the ramp 142 and directed toward the ground surface 103.

The assembly 114 can also include a side discharge aperture 152 disposed through the first side portion 124 of the sidewall 118 and into the first cutting chamber 128. The side discharge aperture 152 can be adapted to allow grass clippings disposed within one or more of the first, second, and third cutting chambers 128, 130, 150 to exit through the first side portion 124 of the sidewall 118 in a desired direction, e.g., to the side of the assembly 114 as shown in FIG. 3 or to the rear of the assembly.

The assembly 114 can further include a plate 154 disposed adjacent the side discharge aperture 152 that is adapted to move between a closed position and an open position. As used herein, the phrase "adjacent the side discharge aperture" means that an element or component of the assembly 114 is disposed closer to the side discharge aperture 152 than to either the front or rear portions 120, 122 of the sidewall 118. The side discharge aperture 152 is at least partially obstructed when the plate 154 is in the closed position and unobstructed when the plate is in the open position. In one or more embodiments, the side discharge aperture 152 is completely obstructed when the plate 154 is in the closed position and unobstructed when the plate is in the open position.

Any suitable technique or techniques can be utilized to manipulate the plate 154 between the open position and the closed position. In one or more embodiments, an actuator 172 can be operatively coupled or connected to the plate 154, where the actuator is adapted to manipulate the plate between the open and closed positions. The actuator 172 can include any suitable manual or powered device.

In one or more embodiments, the assembly 114 can include a door 168 disposed adjacent the outlet 138 of the first cutting chamber 128 as shown in FIG. 3. The door 168 can take any suitable shape or shapes and is adapted to move between a closed position and an open position. The outlet 138 of the first cutting chamber 128 is at least partially obstructed when the door 168 is in the closed position and unobstructed when the door is in the open position. In one or more embodiments, the outlet 138 of the first cutting chamber 128 is completely obstructed when the door 168 is in the closed position and unobstructed when the door is in the open position.

Any suitable technique or techniques can be utilized to manipulate the door 168 between the open and closed positions. In one or more embodiments, an actuator 170 can be operatively coupled or connected to the door 168, where the actuator is adapted to manipulate the door 168 between the open and closed position. The actuator 170 can include any suitable actuator, e.g., one or more of the actuators described herein regarding actuator 172.

In general, the door 168 is adapted to prevent clippings from being directed from the first cutting chamber 128 into the channel 134. In one or more embodiments, the door 168 and the plate 154 can be manipulated such that each of the door and the plate are in the closed position. In such an embodiment, grass clippings disposed within the first cutting chamber 128 cannot be directed into the channel 134 or through the side discharge aperture 152. Instead, such clippings may be directed downward towards the ground surface 103. Further, in one or more embodiments, the door 168 and the plate 154 can be manipulated such that the plate is in the closed position while the door is in the open position. In such embodiments, at least a portion of the clippings disposed within the first cutting chamber 128 can be directed through the outlet 138 of the first cutting chamber and into the channel 134 while not being directed through the side discharge aperture 152. Further, in one or more embodiments, the door 168 and the plate 154 can be adapted such that the door is in the closed position while the plate is in the open position. In such embodiments, at least a portion of clippings disposed within the first cutting chamber 128 can be directed through the side discharge aperture 152 but not into the channel 134.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described, and reference has been made to possible variations of the same. These and other variations, combinations, and modifications will be apparent to those skilled in the art, and it should be understood that the claims are not limited to the illustrative embodiments set forth herein.

What is claimed is:

1. A cutting deck assembly comprising:
   a top surface;
   a sidewall extending from the top surface and comprising a front portion, a rear portion, a first side portion, and a second side portion, wherein the top surface and the sidewall partially surround a first cutting chamber and a second cutting chamber, wherein each of the first and second cutting chambers is adapted to contain a cutting blade;
   a channel disposed adjacent the rear portion of the sidewall and extending along a channel axis between a first end and a second end of the channel, wherein the first end of the channel is connected to an outlet of the first cutting chamber; and
   a ramp disposed at least partially within the channel and adjacent the second end of the channel, wherein the ramp comprises a nonplanar directing surface that is adapted to deflect at least a portion of clippings that enter the channel from the outlet of the first cutting chamber, wherein the nonplanar directing surface is further adapted to deflect the at least a portion of clippings in a direction away from the top surface toward the ground surface.

2. The assembly of claim 1, further comprising a side discharge aperture disposed through the first side portion of the sidewall and into the first cutting chamber.

3. The assembly of claim 2, further comprising a plate disposed adjacent the side discharge aperture and adapted to move between a closed position and an open position, wherein the side discharge aperture is at least partially obstructed when the plate is in the closed position and unobstructed when the plate is in the open position.

4. The assembly of claim 1, further comprising an interior baffle extending from the top surface and further defining 1 or both of the first and second cutting chambers.

5. The assembly of claim 1, further comprising a second ramp disposed at least partially within the channel and adjacent the first end of the channel, wherein the second ramp comprises a directing surface that is adapted to deflect at least a portion of the clippings that enter the channel.

6. The assembly of claim 1, wherein the channel comprises a top wall and first and second vertical walls that extend from the top wall, wherein the channel is open facing away from the top wall.

7. The assembly of claim 6, wherein a distance between the first and second vertical walls measured in a direction orthogonal to the channel axis remains constant along the channel axis.

8. The assembly of claim 6, wherein a distance between the first and second vertical walls measured in a direction orthogonal to the channel axis varies along the channel axis.

9. The assembly of claim 1, wherein the second cutting chamber comprises an inlet adjacent the second end of the channel, wherein the channel is adapted such that at least a portion of clippings deflected by the ramp is directed into the second cutting chamber through the inlet.

10. A grounds maintenance vehicle, comprising:
    a frame comprising a front end, a rear end, and a longitudinal axis extending between the front end and the rear end; and
    a cutting deck assembly connected to the frame at or near the front end of the frame, the assembly comprising:
      a top surface;
      a sidewall extending from the top surface and comprising a front portion, a rear portion, a first side portion, and a second side portion, wherein the top surface and the sidewall partially surround a first cutting chamber and a second cutting chamber, wherein each of the first and second cutting chambers is adapted to contain a cutting blade;
      a channel disposed adjacent the rear portion of the sidewall and extending along a channel axis, wherein the channel comprises a first end connected to an outlet of the first cutting chamber and a second end; and
      a ramp disposed at least partially within the channel and adjacent the second end of the channel, wherein the ramp comprises a directing surface that is adapted to deflect at least a portion of clippings that enter the channel from the outlet of the first cutting chamber, wherein the ramp is further adapted to deflect the at least a portion of clippings away from the top surface toward the ground surface.

11. The vehicle of claim 10, further comprising a power system comprising a prime mover and an implement drive system, wherein the implement drive system is connected to the cutting deck assembly.

12. The vehicle of claim 10, further comprising a second ramp disposed at least partially within the channel and adjacent the first end of the channel, wherein the second ramp comprises a directing surface that is adapted to deflect at least a portion of the clippings that are deflected by the directing surface of the ramp.

13. The vehicle of claim 10, wherein the channel comprises a top wall and first and second vertical walls that extend from the top wall, wherein the channel is open facing away from the top wall.

14. The vehicle of claim 10, wherein the second cutting chamber comprises an inlet adjacent the second end of the channel, wherein the channel is adapted such that at least a portion of clippings deflected by the ramp is directed into the second cutting chamber through the inlet.

15. The vehicle of claim 10, further comprising a door disposed adjacent the outlet of the first cutting chamber, wherein the door is adapted to move between a closed position and an open position, wherein the outlet of the first cutting chamber is at least partially obstructed when the door is in the closed position and unobstructed when the door is in the open position.

16. The vehicle of claim 10, wherein the channel axis forms an angle with a longitudinal axis of the cutting deck assembly, wherein the longitudinal axis of the assembly extends between the front portion and the rear portion of the sidewall.

17. The vehicle of claim 16, wherein the angle is at least 40 degrees and no greater than 185 degrees.

18. The assembly of claim 1, wherein the cutting deck assembly further comprises a third cutting chamber disposed between the first and second cutting chambers.

19. The vehicle of claim 15, further comprising an actuator operatively coupled or connected to the door and adapted to manipulate the door between the open position and the closed position.

* * * * *